United States Patent
Xing et al.

(10) Patent No.: US 10,625,229 B2
(45) Date of Patent: Apr. 21, 2020

(54) DEVICE FOR PREPARING NANO-CARBON UREA

(71) Applicant: BEIJING NANO HI-TECH MATERIAL CO., LTD., Beijing (CN)

(72) Inventors: Wenying Xing, Beijing (CN); Ligang Zuo, Beijing (CN); Lele Zuo, Beijing (CN); Kaisheng Li, Beijing (CN)

(73) Assignee: BEIJING NANO HI-TECH MATERIAL CO., LTD., Beijing (CN)

( * ) Notice: Subject to any disclaimer, the term of this patent is extended or adjusted under 35 U.S.C. 154(b) by 0 days.

(21) Appl. No.: 16/088,812

(22) PCT Filed: Sep. 29, 2017

(86) PCT No.: PCT/CN2017/104388
§ 371 (c)(1),
(2) Date: Sep. 26, 2018

(87) PCT Pub. No.: WO2018/064958
PCT Pub. Date: Apr. 12, 2018

(65) Prior Publication Data
US 2019/0336928 A1    Nov. 7, 2019

(30) Foreign Application Priority Data

Oct. 3, 2016    (CN) .................... 2016 2 1103988 U

(51) Int. Cl.
*B01D 1/18*    (2006.01)
*B01J 2/04*    (2006.01)
(Continued)

(52) U.S. Cl.
CPC ................. *B01J 2/04* (2013.01); *B01D 1/18* (2013.01); *C05C 9/005* (2013.01); *B82Y 30/00* (2013.01)

(58) Field of Classification Search
CPC ...... B01J 2/04; B01J 2/16; B01D 1/18; C05C 9/005
See application file for complete search history.

(56) References Cited

U.S. PATENT DOCUMENTS 3,533,829 A * 10/1970 Quanquin ............... B01J 2/04
                                                        427/213
3,819,310 A *  6/1974 Mavrovic ............... B01J 2/04
                                                         425/6
(Continued)

FOREIGN PATENT DOCUMENTS

CN    201346454 Y    11/2009
CN    202876620 U     4/2013
(Continued)

OTHER PUBLICATIONS

The International Search Report of corresponding International PCT Application No. PCT/CN2017/104388, dated Jan. 2, 2018.

*Primary Examiner* — Jonathan Miller
(74) *Attorney, Agent, or Firm* — J.C. Patents

(57) ABSTRACT

A device for preparing nano-carbon urea comprising: the urea inlet pipe is connected to the conical nozzle above the urea granulation tower, install the spray device under the natural ventilation window of the urea granulation tower, the spray device is connected to the atomizing nozzle through the spray manifold, the spray manifold is connected to the atomizing nozzle, they are all located inner the urea granulation tower above the urea rotary sweep, urea discharge funnel is set on the bottom of urea granulation tower; urea discharge funnel is connected to the drum drying device, an atomizer is arranged between the drum drying device and the urea discharge funnel. This utility model comprises two stages which combines tower internal, external spray absorption and drying, the content of urea nano-carbon is increased.

2 Claims, 1 Drawing Sheet

(51) Int. Cl.
*C05C 9/00* (2006.01)
*B82Y 30/00* (2011.01)

(56) References Cited

U.S. PATENT DOCUMENTS

| | | | | |
|---|---|---|---|---|
| 4,219,589 | A * | 8/1980 | Niks | B01J 2/16 427/213 |
| 4,353,709 | A * | 10/1982 | Nioh | C05C 9/005 23/313 FB |
| 4,370,198 | A * | 1/1983 | Dencs | B01D 1/18 159/16.1 |
| 4,449,900 | A * | 5/1984 | Lerner | C05C 9/00 264/12 |
| 5,514,307 | A * | 5/1996 | Shirley, Jr. | B01J 2/04 264/13 |
| 6,125,552 | A * | 10/2000 | Braun | B01J 2/16 34/329 |
| 7,838,080 | B2 * | 11/2010 | Rumpler | B01J 2/16 427/430.1 |
| 7,993,595 | B2 * | 8/2011 | Jacob | B01J 2/16 23/313 FB |
| 8,834,142 | B2 * | 9/2014 | Kojima | B01J 2/16 264/12 |
| 9,403,733 | B2 * | 8/2016 | Bedetti | B01J 2/04 |
| 2009/0123665 | A1 * | 5/2009 | Zaima | B01J 2/16 427/595 |
| 2015/0166421 | A1 * | 6/2015 | Bedetti | B01J 2/04 71/28 |

FOREIGN PATENT DOCUMENTS

| | | |
|---|---|---|
| CN | 104822448 A | 8/2015 |
| CN | 205152092 U | 4/2016 |
| CN | 206188676 U | 5/2017 |

* cited by examiner

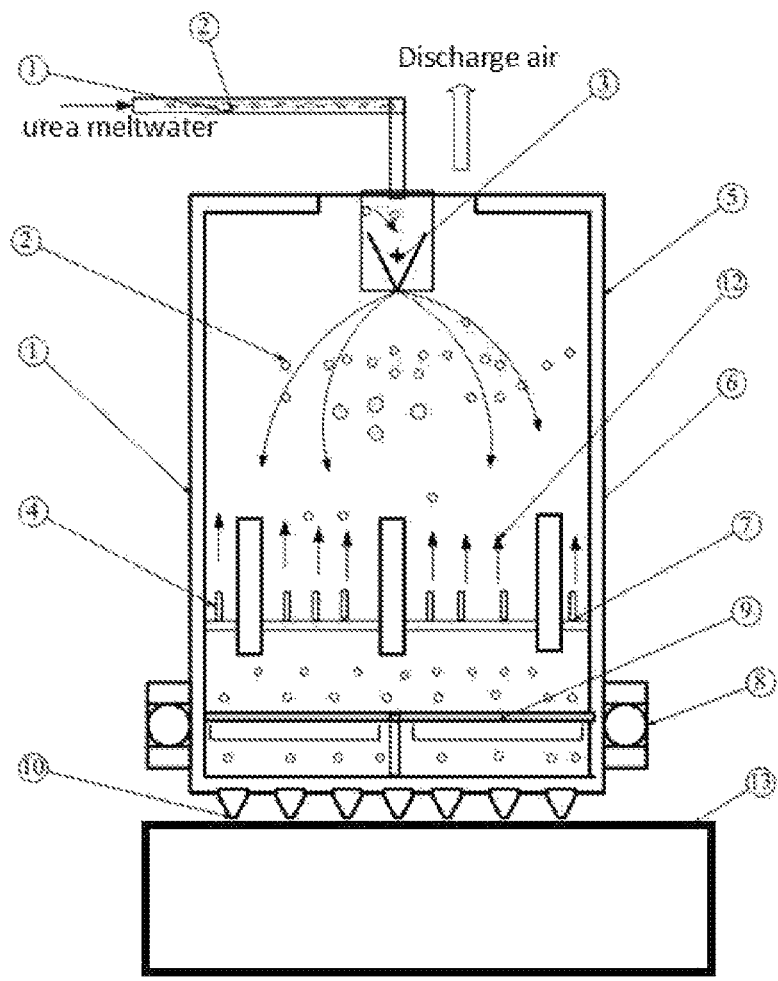

DEVICE FOR PREPARING NANO-CARBON UREA

CROSS-REFERENCE TO RELATED APPLICATION

This application is a national phase application of international application No. PCT/CN2017/104388 filed on Sep. 29, 2017, which in turn claims the priority benefits of Chinese application No. 201621103988.5, filed on Oct. 3, 2016. The contents of these prior applications are hereby incorporated by reference in their entirety.

TECHNICAL FIELD

The present disclosure relates to a device for preparing nano-carbon urea.

BACKGROUND

Currently used fertilizer utilization rate is low, mainly for nitrogen fertilizer, especially when urea is applied to soil, under the action of water and urease, the nitrogen is dissolved into amide state, the amide nitrogen fertilizer was further decomposed into $NH_4$ and $CO_2$, nitrification of $NH_4$ is produced under the action of soil microorganisms, and part of it is transformed into $NO_2$—, $NO_2$, the other part of it is transformed into $HNO_3$ and nitrates, $NO_2$-nitrosamine salt is carcinogenic substances, $NO_2$ gas evaporates from the soil and destroys the ozone layer, excessive nitrate infiltration causes groundwater pollution and eutrophication of rivers and lakes. Urea yield in China is more than 60 percent of the yield of total fertilizer, during the industrialization of urea production, the country invested a lot of energy and money to produce fertilizer, however, due to the easy decomposition of urea into soil, the nitrogen utilization rate was only 35%, this means energy waste and inefficiency, at the same time, it also brings serious environmental pressure. In order to improve the utilization rate of fertilizer, the utility model uses nano-carbon sol as urea synergist to add into urea during the process of urea preparation to improve the utilization rate of fertilizer. The development of nano-carbon fertilizer can solve the problems of fertilizer utilization and environmental protection, it is of great significance to achieve zero growth of fertilizer application and green sustainable development of agriculture.

SUMMARY

The present disclosure discloses a device for preparing nano-carbon urea.

A device for preparing nano-carbon urea comprising:

The urea inlet pipe 1 is connected to the conical nozzle 2 above the urea granulation tower, install the spray device 8 under the natural ventilation window of the urea granulation tower, the spray device 8 is connected to the atomizing nozzle 4 through the spray manifold 7, the spray manifold 7 is connected to the atomizing nozzle, they are all located inner the urea granulation tower 5 above the urea rotary sweep 9, urea discharge funnel is set on the bottom of urea granulation tower; urea discharge funnel is connected to the drum drying device, an atomizer is arranged between the drum drying device and the urea discharge funnel.

Further, the starting point of spray device is more than 20 meters above the height of urea granulation tower.

The utility model atomizes nano carbon sol, inject to urea directly to form nano-carbon urea, it directly falls to the urea discharge funnel on the bottom of the tower. Before the urea discharge funnel is connected and sent to the drying device of drum, nano-carbon urea is sprayed with nanocarbon atomizing sol again, it flows reversely with the blowing in hot air to evaporate water, and finally into conveyor belt and packaging.

This utility model comprises two stages which combines tower internal, external spray absorption and drying, the content of urea nano-carbon is increased.

DESCRIPTION OF THE DRAWINGS

FIG. 1 is the schematic diagram of the invention.

| | | |
|---|---|---|
| 1. urea inlet pipe | 2. urea meltwater | 3. conical nozzle |
| 4. atomizing nozzle | 5. granulation tower | 6. ventilation hole |
| 7. spray manifold | 8. spray device | 9. urea rotary sweep |
| 10. urea funnel | 11. conveyor | 12. physical nano-carbon sol |
| 13. drum drying device | | |

DESCRIPTION OF THE PREFERRED EMBODIMENTS

A method for preparing nano-carbon urea from urea granulation tower using nano-carbon sol comprising:

Step 1, atomize 0.57%-2% nano-carbon sol through compressed air and liquid pump or atomizing device and it is sprayed on a 70-80 ▢ urea surface, the spray amount is 1-5% of fertilizer weight.

Step 2, install the spray device under the natural ventilation window of the urea granulation tower, the nano-carbon sol was atomized under 4-7 mpa using a spray device, the starting point of the spray device is more than 20 meters above the height of the feeder on the bottom of the tower, the exit temperature of urea is 120-135° C., the temperature drops to 70-80 ▢ when urea drops to 30-50 meters from the bottom to contact with the nano-carbon sol, the flow atomized sol communicate with the hot urea particles under the help of rising gas, the spray is 10 meters high, allowing the nano-carbon sol to penetrate into the interior of urea particles. Due to the stable dispersity of the nano-carbon sol and its pH value is between 1 and 3, it can be evenly distributed on the surface of urea and absorb volatile ammonia gas, the negative potential can permeate into the crystal of urea to produce stable gray-black urea particles containing nano-carbon.

Step 3, at the same time, the heat of crystallization is generated during the process of urea crystallization and used to evaporate the water to lower the temperature to 55-60° C.

Step 4, connect and feed into drum drying device, the nanocarbon containing urea was sprayed with nano-carbon sol again, spraying mount is 1%-5% of the fertilizer weight, it flow reversely to the hot air blows in at 70° C. to evaporate the water. Finally it enter into conveyor and packing.

1. The nano-carbon sol produced by the invention shows good dispersion and stability in liquid, it will not produce precipitation after using for more than 3 years, as a fertilizer, additive stability and dispersibility is very important.

2. The nano-carbon sol produced by the invention produces the electric conductivity under the nanometer scale, the conductivity is 800-3600 μs/cm, it blends well with urea.

3. The nano-carbon sol produced by the invention shows good adsorption ability, pH is 1-3, potential is −15-35 mV, It is easy to combine with unstable $NH_4$ in the process of urea granulation to produce stable urea.

4. The nano-carbon sol produced by the invention fully conforms to the definition of the internationally recognized standardization organization. The particle size of nano-carbon is under 100 nm and it is controlled from 98-100% (detected by Malvern laser particle size meter), the mass of nano-carbon basis is 0.57-2%.

5. The key factor to increase urea utilization is the use of good inhibitors, at present, the inhibitors in the market are fine chemical products, which are low in variety and high in price, some of them are toxic such as cyanokun, formaldehyde and chlorine-6 methylpyrimethamine, etc. The nano-carbon sol produced by our company is non-toxic, after detecting by national fertilizer supervision, inspection and testing center (Shanghai) based on the national standard for stable fertilizer testing, the nitrification inhibition rate of nano-carbon sol was 6%-25%, see annex 1 for details. It is a good synergistic material for the preparation of stable urea.

After years of research: nano-carbon sol is broad-spectrum and highly adaptable, suitable for field crops such as corn, rice and cash crops such as tobacco, vegetables and fruit trees, it showed good effect of increasing yield, under the same conditions, reduce the amount of fertilizer use by 10% does not affect yield and has the effect of improving the quality of agricultural products.

Embodiment 1

The results of the experiment on the application of nano-carbon urea by bimeng academy of agricultural sciences in Inner Mongolia in 2016 are as follows:

Nano-carbon urea is provided by the invention containing 46% nitrogen, and the amount of nano-carbon sol added is 10% of fertilizer weight, color: grey.

Corn variety: Simon 568

Test site: Garden Canal Test Station of Agriculture and Animal Husbandry Science Research Institute, Bayannur City Random plot arrangement, 5 treatments, four repeats, 16 plots, mulch planting. The results are as follows:

TABLE 1

Application effect of nano-carbon urea in corn

| No. | Treatment | Sol addition | Fertilizer addition | Fertilizer rate (kg/a unit of area) Base fertilizer | Fertilizer rate (kg/a unit of area) Additional fertilizer | Yield kg/a unit of area | Yield Increase yield % |
|---|---|---|---|---|---|---|---|
| 1 | regular fertilizing | 0 | Pure N 20 kg/a unit of area, $P_2O_5$ 12 kg/a unit of area, $K_2O$ 5 kg/a unit of area | Common urea 8.3 | Common urea 8.330 | 1002.98 | |
| 2 | nano-carbon urea | 10% | Pure N 20 kg/a unit of area, $P_2O_5$ 12 kg/a unit of area, $K_2O$ 5 kg/a unit of area | Common urea 8.3 | nano-carbon urea 30 | 1108.28 | 10.5 |
| 3 | nano-carbon urea-N 10% | 10% | Pure N 18 kg/a unit of area, $P_2O_5$ 12 kg/a unit of area, $K_2O$ 5 kg/a unit of area | Common urea 8.3 | nano-carbon urea 25 | 1095.12 | 9.2 |
| 4 | nano-carbon urea-N 20% | 10% | Pure N 16 kg/a unit of area, $P_2O_5$ 12 kg/a unit of area, $K_2O$ 5 kg/a unit of area | Common urea 8.3 | nano-carbon urea 21 | 976.66 | −2.6 |

After applying to corn crops in 2014 and 2015 by using nano-carbon sol, the results showed that the effect of nano-carbon on corn yield increased obviously. On this basis, the experiment of adding nano-carbon sol with urea was carried out in 2016, the amount of nano-carbon added was 10% of the weight of fertilizer, the results of field yield measurement showed that: it increases the yield by 10.5% compared with using normal urea; the yield also increased by 9.2% with a 10% reduction in nitrogen fertilizer application; when the reduction of nitrogen fertilizer is 20%, the yield slightly decrease by 2%. It shows that nano-carbon is very effective in increasing nitrogen utilization rate and reducing nitrogen and fertilizer use which is of great significance for improving yield and quality, reducing input of agricultural chemicals and reducing pressure of environmental pollution, it is satisfied with the national 13th five-year development strategy of zero growth of fertilizers and pesticides.

Embodiment 2

Soybean Experiment in Heilongjiang Agricultural Academy
Test site: Heilongjiang Academy of Agricultural Sciences Laboratory
Entrusted unit: Plant Nutrition and Environment Institute of Heilongjiang Agricultural Academy
1. Trial Objective
To determine the application effect and nitrogen utilization rate of nano-fertilizer on soybean and rice.
2. Raw Materials
Nano urea (46-0-0), calcium superphosphate (0-43-0), potassium sulfate (0-0-0-50), nano carbon sol content 0.57% solute, added amount is 10% of urea weight.
3. Test Method
Soybeans Potted Test
4. Soy Bean Test
There 3 plants per pot, repeat 6 times. N:P:K rating is 5:3.5:3, the results are as follows:

Test Sheet of Heilongjiang Soybean

| Treatment | Measurement | Sol addition | Nitrogen fertilization per pot | strain per pot | Average yield g/pot | Increase yield % |
|---|---|---|---|---|---|---|
| 1 | CK (withdrawal of nitrogenous fertilizer) | 0 | Urea 10.8 g heavy calcium 8.1 g potassium sulfate 6 g | 3 | 39 | — |
| 2 | Urea (conventional fertilization) | 0% | Urea 10.8 g heavy calcium 8.1 g potassium sulfate 6 g | 3 | 50 | — |
| 3 | Nano urea | 10% | Urea 10.8 g heavy calcium 8.1 g potassium sulfate 6 g | 3 | 60 | +20 |
| 4 | 90% Nano urea dosage (reduction of nitrogen fertilizer 10%) | 10% | Urea 9.7 g heavy calcium 8.1 g potassium sulfate 6 g | 3 | 48 | −4 |
| 5 | 80% Nano urea dosage (reduction of nitrogen fertilizer 20%) | 10% | Urea 8.1 g heavy calcium 8.1 g potassium sulfate 6 g | 3 | 42 | −16 |

The experiment results indicate that, as a fertilizer synergist, the nano-carbon can improve fertilizer efficiency and the utilization rate of fertilizer significantly. Compared with the urea formula fertilizer with equal nitrogen content, nano-carbon urea increase the production obviously, it increases the yield by 20%; when nitrogen is reduced by 10%, the yield is basically the same as conventional fertilization with slightly reduced. It shows that nano carbon can improve the utilization rate of fertilizer.

What is claimed is:

1. A device for preparing nano-carbon urea comprising:
an urea inlet pipe, an urea granulation tower, and a drum drying device;
wherein the urea granulation tower comprises a conical nozzle for downwardly spraying urea meltwater, a natural ventilation window, a spray device, an atomizing nozzle for upwardly spraying nano-carbon sol, a spray manifold, an urea rotary sweep, an urea discharge funnel and an atomizer;
wherein, the urea inlet pipe is connected to the conical nozzle above the urea granulation tower, the spray device is installed under the natural ventilation window of the urea granulation tower, the spray device is connected to the atomizing nozzle through the spray manifold, the spray manifold is connected to the atomizing nozzle, the atomizing nozzle and the spray manifold are located above the urea rotary sweep, the urea discharge funnel is set on the bottom of the urea granulation tower; the urea discharge funnel is connected to the drum drying device, the atomizer is arranged between the drum drying device and the urea discharge funnel.

2. A device for preparing nano-carbon urea according to claim 1, wherein a starting point of the spray device is more than 20 meters above the height of the urea granulation tower.

* * * * *